Oct. 29, 1957     A. R. CHASAR     2,811,366

CHUCK JAW WITH SELF TIGHTENING WORK GRIPPING HEAD

Filed May 25, 1956

INVENTOR
Anthony R. Chasar
BY
ATTORNEYS

United States Patent Office 2,811,366
Patented Oct. 29, 1957

2,811,366
CHUCK JAW WITH SELF TIGHTENING WORK GRIPPING HEAD

Anthony R. Chasar, Cleveland, Ohio, assignor to The Oster Manufacturing Company, Wickliffe, Ohio, a corporation of Ohio Application May 25, 1956, Serial No. 587,298

8 Claims. (Cl. 279—123)

This invention relates to chucks and more particularly to a chuck jaw provided with a work gripping member which rocks with respect to the body of the jaw to tighten its grip on the work when engaged with the work and subjected to a torsional thrust due to a turning movement of the chuck. The rocking connection between the jaw body and the work gripping member is preferably in the form of a knife edge fulcrum that provides a substantially frictionless bearing so that a torsional thrust exerted on the work gripping member through its work engaging face is instantly effective to rock the gripping member in a direction to increase the radial pressure exerted on the work. In order to normally hold the work engaging member with its work engaging face substantially normal to a chuck radius centrally disposed with respect to the work engaging member, resilient cushioning means is provided which yieldably resist rocking movements of the work gripping member away from its normal position and which returns the member to normal position when the member is released from the work. The cushioning means is preferably in the form of bodies of elastic rubber bonded to the jaw and work gripping members on opposite sides of the fulcrum. The work engaging face of the gripping member is preferably serrated and, in order to limit the extent to which the work engaging member bites into the work and to protect the rubber cushioning elements against stresses that might impair the bond between the cushioning elements and the jaw and work gripping members, means is provided for positively limiting the angular movements of the work gripping member. To this end the work gripping member may be mounted in a channel formed in an end of the jaw body that is wider than the work gripping member. The channel receives the work gripping member with its work engaging face projecting slightly past the end of the jaw body and the work gripping member is normally held centrally of the channel by the cushioning means. The work gripping member is rockable laterally into engagement with either side wall of the channel in which it is mounted and the extent of angular movement permitted the gripping member is determined by clearance that is provided between the sides of the work gripping member and the sides of the channel.

The work gripping member may advantageously be part of a detachable and replaceable unit mounted in the jaw body. The detachable unit preferably consists of a base member that is received in the end channel of the jaw body and that is rigidly secured to the jaw body by suitable means. The work engaging member and the base member are formed to provide a centrally disposed knife edge fulcrum for the work engaging member and are secured together on opposite sides of the fulcrum by bodies of elastic rubber bonded to the base member and to the work gripping member. The base member when secured in fixed position in the channel of the jaw body functions as a fixed part of the jaw body during operation. By providing a suitable detachable connection between the jaw body and the base member, the work gripping member and base member may be removed and replaced with a new unit.

Objects of the invention are to provide a chuck with work gripping jaws of simple construction having a work gripping member that is moved with respect to the jaw into tighter gripping engagement with the work by torsional thrust exerted on its work engaging face, to provide a fulcrum connection between the work gripping member and body member which offers a minimum of resistance to rocking movement of the work gripping member, to provide a cushioning means which also serves to attach the work gripping member to the jaw body and to provide means for limiting rocking movements of the work gripping member to prevent impairment of the connection between the work gripping member and the chuck jaw and to limit the extent to which a serrated gripping face can bite into the work.

Reference should be had to the accompanying drawings forming a part of this specification in which.

Figure 1:
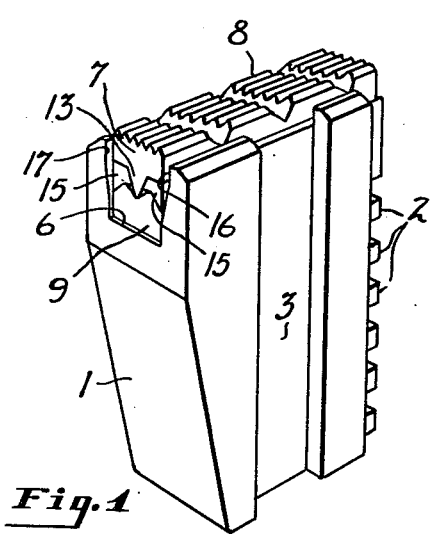
Figure 1 is a perspective view of a chuck jaw embodying the invention.
Figure 2:
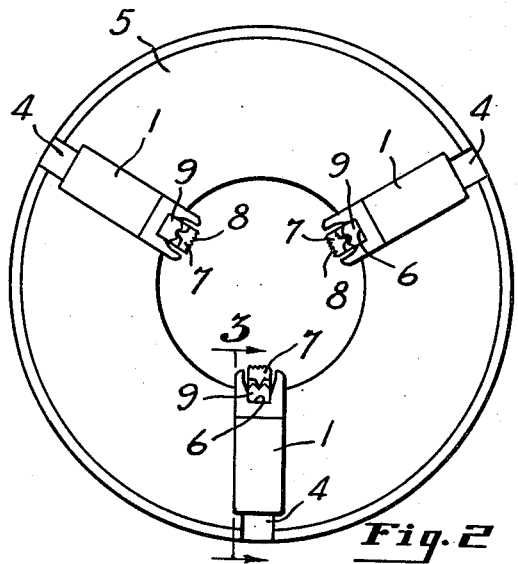
Fig. 2 is a front elevation of the chuck with the jaws of the present invention mounted thereon.
Figure 3:
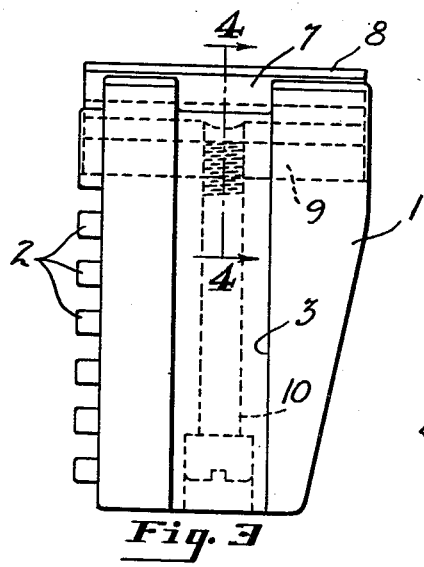
Fig. 3 is a side elevation of a chuck jaw.
Figure 4:
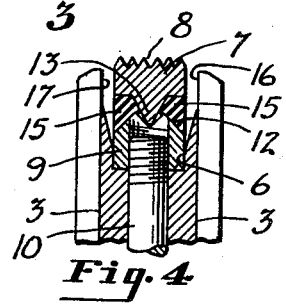
Fig. 4 is a fragmentary section taken on the line indicated at 4—4 in Fig. 3.
Figure 6:
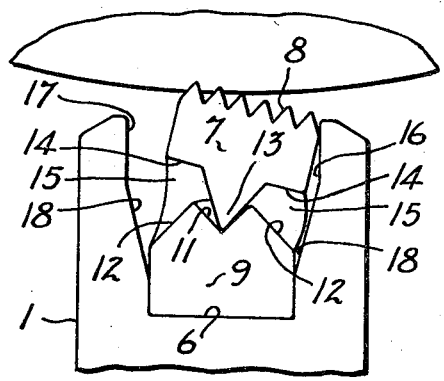
Fig. 6 is an end elevation similar to Fig. 5, showing the work engaging member rocked to the right to its extreme position in engagement with a fixed portion of the chuck body by a clockwise torque thrust.
Figure 5:
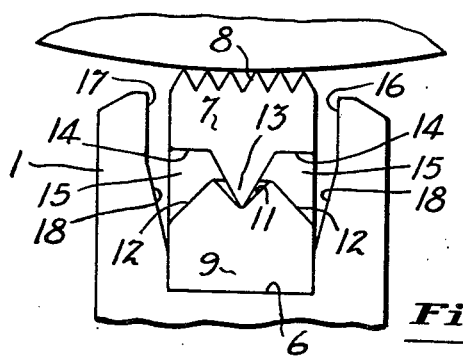
Fig. 5 is a fragmentary end elevation on an enlarged scale showing the work engaging member in its normal position in engagement with a work piece.

Referring to the accompanying drawings, the chuck jaw of the present invention has a body 1 having parallel side faces and provided with teeth 2 on one longitudinal edge thereof for engagement with a scroll wheel or the like for moving the jaw radially. The opposite side faces of the body 1 have longitudinal channels 3 which serve to position the jaw in radial slots 4 of a chuck body 5 as shown in Fig. 2.

The jaw body 1 is provided with a channel 6 that extends the full length of its work engaging end. The channel 6 receives a work gripping member 7 that has a serrated work engaging face 8. The work engaging member 7 is mounted upon a base member 9 that is secured in fixed position with respect to the jaw body 1 in the bottom of the channel 6 by means of an attaching screw 10. To provide a rocking connection between the base member 9 and the work gripping member 7, the base member 9 is provided on its outer face with a longitudinal V-shaped groove 11 that extends the full length thereof. The groove 11 is centrally disposed and the outer face of the base member 9 has inclined shoulders 12 on opposite sides thereof. At its inner side the work gripping member 7 is provided with a central longitudinal V-shaped projection 13 that has its sides disposed at a sharper angle than the sides of the groove 11 and that is of a height materially greater than the depth of the groove 11. The apex of the projection 13 seats in the bottom of the V groove 11 to provide a knife edge fulcrum about which the work gripping member 7 may rock. The inner side of the work gripping member 7 is provided with shoulders 14 on opposite sides of the projection 13 and the work gripping member 7 is secured to the base member 9 by bodies of elastic rubber 15 that are disposed in the spaces between the shoulders 12 and 14 on opposite sides of the fulcrum. The bodies of rubber 15 fill the spaces between the shoulders 12 and 14 outwardly of the groove 11 and are preferably vulcanized in place between the work engaging member and the base member to provide firm bonds between the rubber bodies 15 and the shoulders 12 and 14.

The outer portion of the channel 6 has side faces 16 and 17 that are spaced apart a distance greater than the width of the work gripping member 7 which is normally held in a central position with respect to the faces 16 and 17 by the elastic rubber cushions 15. The spacing of the faces 16 and 17 with respect to the opposite sides of the work gripping member 7 is such as to provide an angular movement which will limit the extent to which the serrated face 8 can bite into the work and which will prevent the exertion of stresses on the elastic rubber bodies 15 which might impair the bonds between these rubber bodies and the shoulders 12 and 14.

The channel 6 may be provided with its bottom portion of a width to provide a snug fit for the base member 9 and the side faces of the channel 6 may have inclined portions 18 which provide sufficient clearance to permit the rubber bodies 15 to bulge freely without engagement with the sides of the channel.

It is to be understood that in accordance with the provisions of the patent statutes, variations and modifications of the specific devices herein shown and described may be made without departing from the spirit of the invention.

What I claim is:

1. A chuck jaw comprising a body member and a work gripping member, one having a V-shaped recess and the other a V-shaped projection with sides at a sharper angle than the sides of said recess and engaging in said recess to provide a knife edge fulcrum about which said gripping member rocks, said work engaging member having a work engaging face at the end thereof remote from said fulcrum, said body member having a portion in the path of movement of said work gripping member and positioned to limit angular rocking movement of said work gripping member, and resilient cushioning means normally positioning said work gripping member with its work engaging face substantially normal to a chuck radius through the center thereof and yieldably resisting a rocking movement of said work gripping member.

2. A chuck jaw comprising a body member and a work gripping member, one having a V-shaped recess and the other a V-shaped projection with sides at a sharper angle than the sides of said recess and engaging in said recess to provide a knife edge fulcrum about which said gripping member rocks, said work engaging member having a work engaging face at the end thereof remote from said fulcrum, said body having stop portions on opposite sides of said work gripping member and in the path of movement thereof to limit the rocking movements of said work gripping member, and resilient cushioning means normally positioning said work gripping member centrally with respect to said stop portions and yieldably resisting rocking movements of said work gripping member in either direction from its central position.

3. A chuck jaw comprising a body member and a work gripping member, one having a V-shaped recess and the other a V-shaped projection with sides at a sharper angle than the sides of said recess and engaging in said recess to provide a knife edge fulcrum about which said gripping member rocks, said work engaging member having a work engaging face at the end thereof remote from said fulcrum, said body having stop portions on opposite sides of said work gripping member and in the path of movement thereof to limit the rocking movements of said work gripping member, and elastic rubber cushions bonded to opposite sides of said work gripping member and to said body, said rubber cushions normally positioning said work gripping member centrally with respect to said stop portions and yieldably resisting rocking movements of said work gripping member in either direction from its central position.

4. A chuck jaw comprising a body member having a V-shaped bearing recess and a body member having a V-shaped apex at one end with its sides at a sharper angle than the sides of said recess and engaging in said recess to provide a knife edge fulcrum about which said work gripping member rocks, said body having stop portions on opposite sides of said bearing recess in the path of movement of said work gripping member for limiting its movement about said fulcrum, and bodies of elastic rubber on opposite sides of said work gripping member and interposed between said work gripping member and said body member to normally position said work gripping member centrally with respect to said stop portions and to yieldably resist rocking movements of said work gripping member in either direction from said central position.

5. A chuck jaw comprising a body member and a work gripping member mounted in an end of said body member and having a work engaging face at its outer end, means forming a fulcrum between the inner end of said work gripping member and the body member about which said work gripping member rocks, bodies of elastic rubber interposed between opposite sides of said work gripping member and to said body and forming cushions to yieldingly resist movements of said work gripping member in either direction from a central position, and means independent of said cushions for limiting rocking movements of said work gripping member.

6. A chuck jaw having a body member provided with a channel opening to an end thereof, a work gripping unit detachably mounted in said channel comprising a base member mounted in the bottom portion of said channel and a work gripping member narrower than the outer portion of said channel and having an outer work engaging face, said work gripping member being rockable on said base member into engagement with either side of said channel, and resilient cushioning means normally holding said work gripping member centrally of said channel and yieldable to permit said work gripping member to rock into engagement with either side of said channel.

7. A chuck jaw having a body member provided with a channel opening to an end thereof, a work gripping unit detachably mounted in said channel comprising a base member mounted in the bottom portion of said channel and a work gripping member narrower than the outer portion of said channel and having an outer work engaging face, said base member having a centrally disposed V-shaped recess and shoulder portions on opposite sides of said recess, said work gripping member being narrower than said channel and having V-shaped projections at its inner end with sides at a sharper angle than the sides of said recess and of a height materially greater than the depth of said recess that engage in said recess, said work gripping member having shoulders on opposite sides of said projection, bodies of elastic rubber interposed between shoulders of said base member and said work gripping member, said rubber bodies normally holding said work gripping member centrally of said channel and being yieldable to permit said work gripping member to rock into engagement with either side of said channel.

8. A chuck jaw having a body member provided with a channel across an end thereof, a work gripping unit detachably mounted in said channel comprising a base member having a centrally disposed V-shaped recess extending across its top face centrally thereof, a work gripping member having a V-shaped projection across its inner end centrally thereof that has sides at a sharper inclination than the sides of said recess, that is of a height substantially greater than the depth of said recess and that engages in said recess and bodies of elastic rubber bonded to opposed faces of said base member and said work gripping member on opposite sides of said recess and said projection, said work gripping member being narrower than the outer portion of said channel and rockable into engagement with either side of said channel, and means for detachably securing said base member in said channel.

References Cited in the file of this patent

UNITED STATES PATENTS

| | | |
|---|---|---|
| 1,918,439 | Warman | July 18, 1933 |
| 2,562,067 | Sloan | July 24, 1951 |